July 21, 1959 L. LIDSKY 2,895,699

AIR CONDITIONER UNIT MOUNTING

Filed July 31, 1957 4 Sheets-Sheet 1

INVENTOR.

LOUIS LIDSKY.

BY

Ward Neal Haselton Orme & McElhannon

ATTORNEYS.

July 21, 1959 L. LIDSKY 2,895,699

AIR CONDITIONER UNIT MOUNTING

Filed July 31, 1957 4 Sheets-Sheet 2

INVENTOR.

BY LOUIS LIDSKY.

Ward Neal Haselton Orme & McElhannon

ATTORNEYS.

July 21, 1959 | L. LIDSKY | 2,895,699

AIR CONDITIONER UNIT MOUNTING

Filed July 31, 1957 | 4 Sheets-Sheet 3

INVENTOR.
LOUIS LIDSKY.

BY

Ward Neal Haselton Orme & McElhannon
ATTORNEYS

AIR CONDITIONER UNIT MOUNTING
Filed July 31, 1957
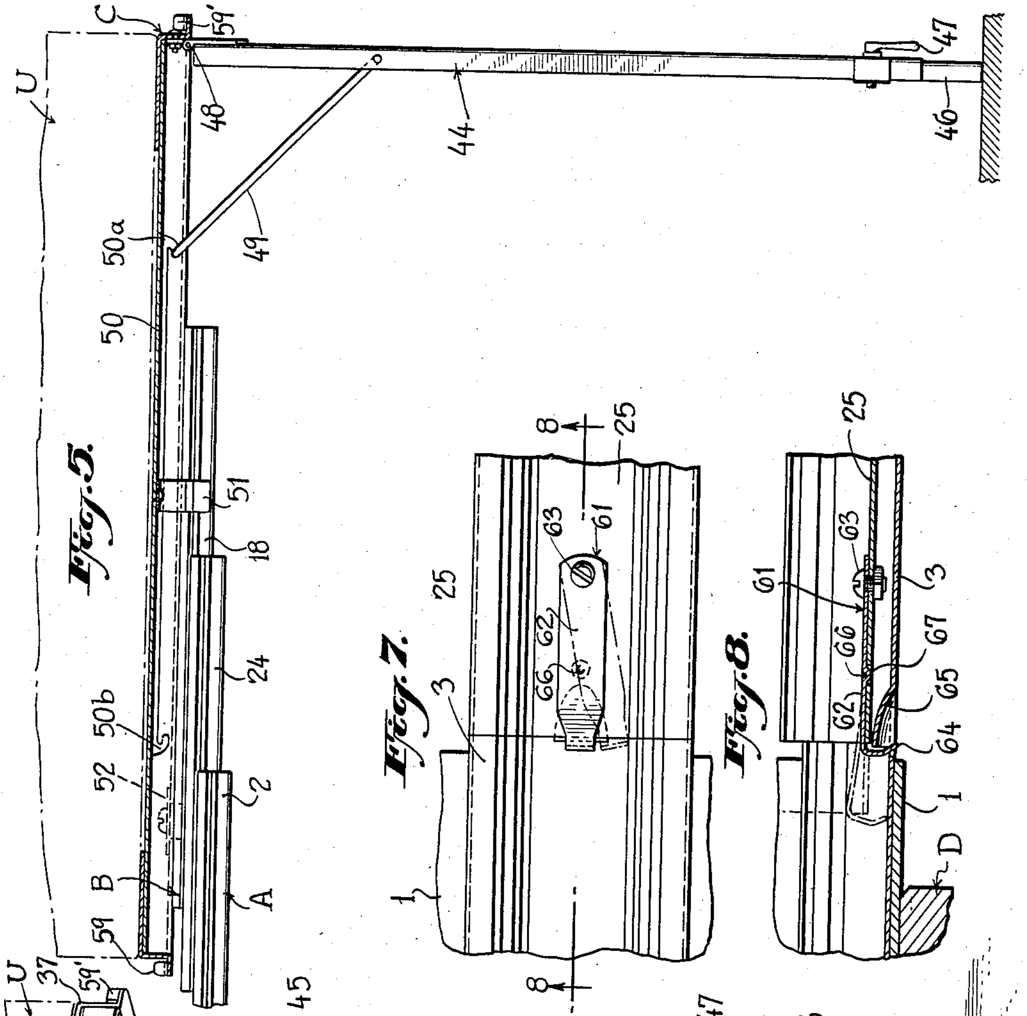
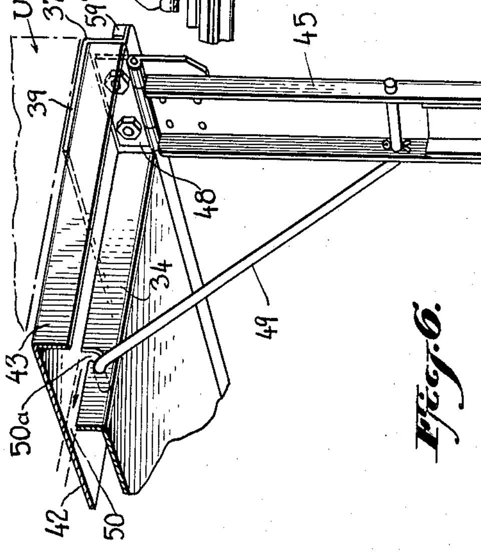
INVENTOR.
LOUIS LIDSKY.
BY
Ward Neal Haselton Orme & McElhannon.
ATTORNEYS.

United States Patent Office 2,895,699

Patented July 21, 1959

1

2,895,699

AIR CONDITIONER UNIT MOUNTING

Louis Lidsky, Jamaica Estates, N.Y., assignor to The L and P Electric Company, Inc., Maspeth, N.Y., a corporation of New York Application July 31, 1957, Serial No. 675,434

8 Claims. (Cl. 248—208)

This invention relates to air conditioner unit mounting and especially to adjustable mounting of window type air conditioner units.

An object of the invention is to provide a structure wherein the air conditioner unit may be selectively disposed so as to project outwardly of the window the desired distance when in use and withdrawn entirely within the window when it is desired to close the window.

Another object is to provide a structure wherein the conditioner unit when withdrawn entirely inside the window readily may be moved to one side of the window opening to permit ready ingress and egress through the window for window cleaning or other purposes.

A further object is to provide a universal mounting which can be prefabricated to mount units of varying dimensions to windows having varying characteristics as to size and location, and to provide for swinging the unit to either the right or left side of the window.

Further and other objects, features and advantages of the invention will more clearly appear from the detailed description given below, taken in conjunction with the accompanying drawings illustrating, by way of example, the presently preferred embodiment of the invention, and in which:

Fig. 1 is a plan view showing the conditioner unit moved inwardly within the window the maximum extent of adjustment and swung to one side of the window opening to permit ready access to the window sashes and ingress and egress through the window openings;

Fig. 1*a* is a somewhat diagrammatical side elevational view showing the mounting adjusted to the position of use in which the air conditioner unit projects outwardly beyond the window opening;

Fig. 5 is a side elevational view of a portion of the apparatus as shown in Fig. 1, viewed from the left hand side;

Fig. 6 is a perspective fragmentary view showing further details of the leg support;

Fig. 7 is a fragmentary plan view showing details of a latching mechanism; and

Fig. 8 is a longitudinal sectional view taken at line 8—8 of Fig. 7.

Figure 1:
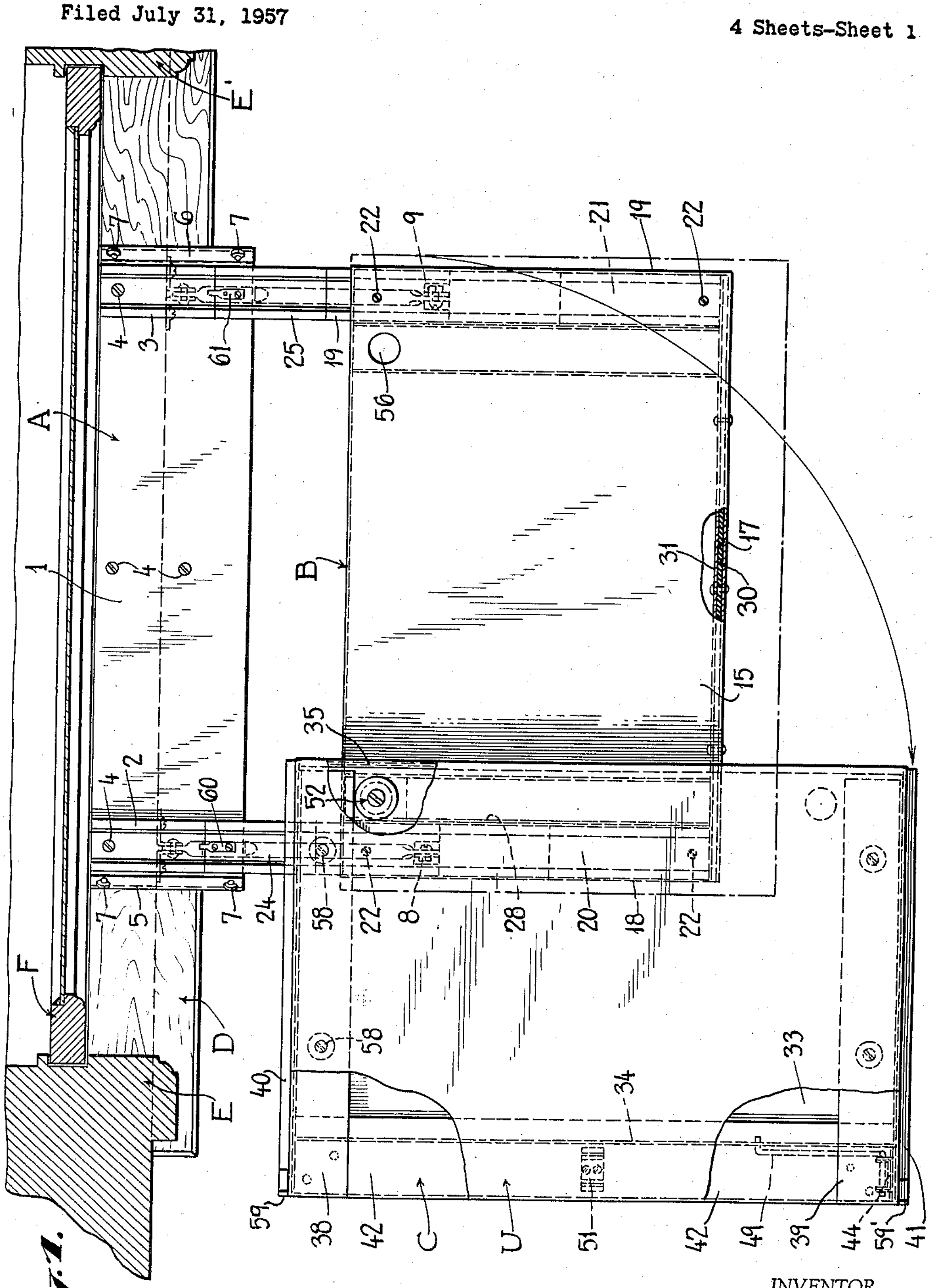
Figure 2:
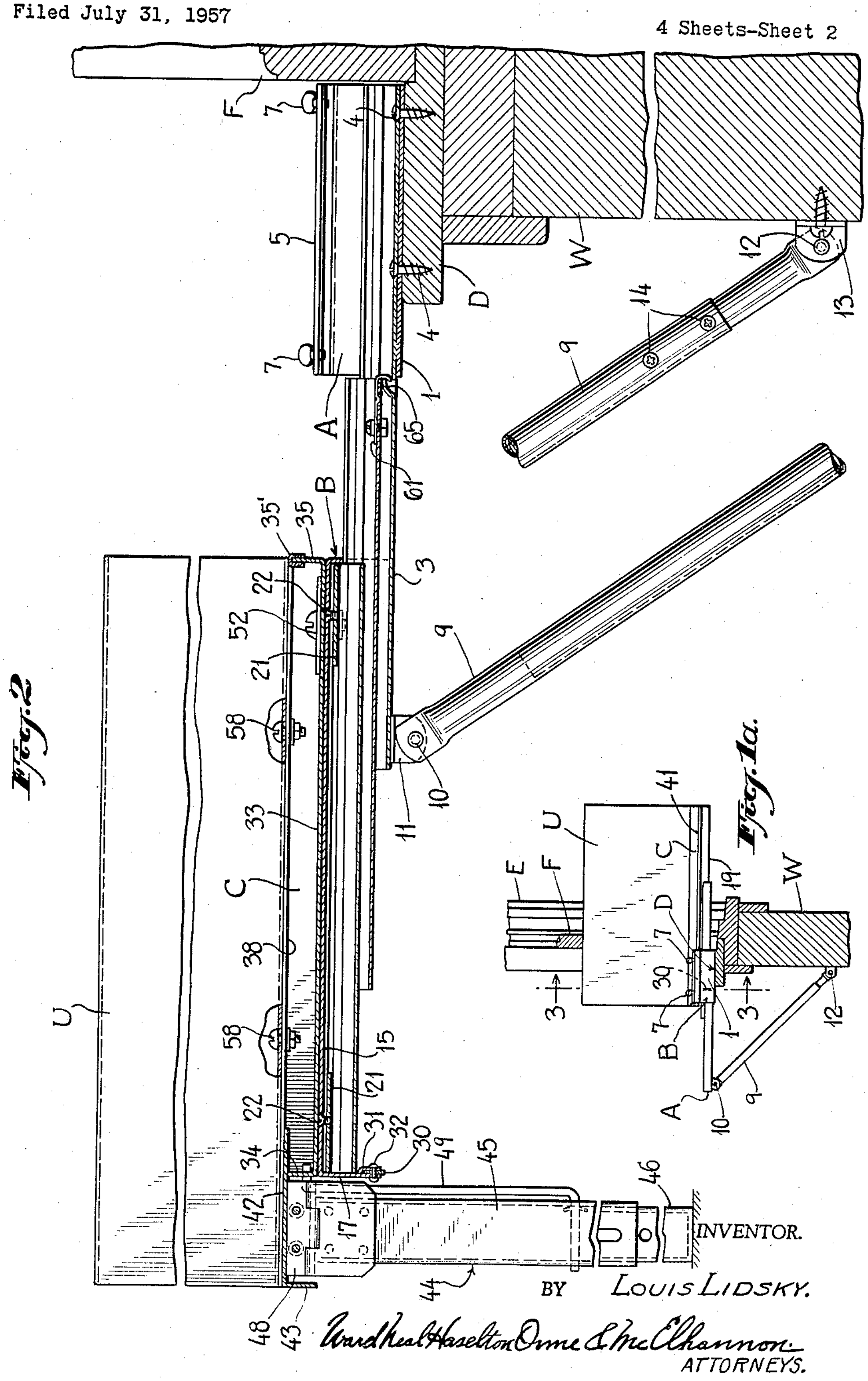
Fig. 2 is a side elevational view of the mounting as shown in Fig. 1, with certain parts in section, on a somewhat enlarged scale and showing the mounting adjusted so that the unit is disposed to the full extent of its inward movement but not swung to one side as in Fig. 1.

Referring to the drawings, and more particularly to Figs. 1, 1*a* and 2, the major components of the adjustable mounting structure comprise a foundation assembly designated in general as A, a sliding assembly or tray designated in general as B, and a pivotal assembly or tray

2 designated in general as C. The foundation assembly A is rigidly secured to a window sill D between the window stiles E and E′ just in front of a window sash F which, when in raised position, together with the stiles E, E′ and the sill D, define the window opening in which the air conditioner unit is positioned when in use.

*Foundation assembly*

Figure 3:
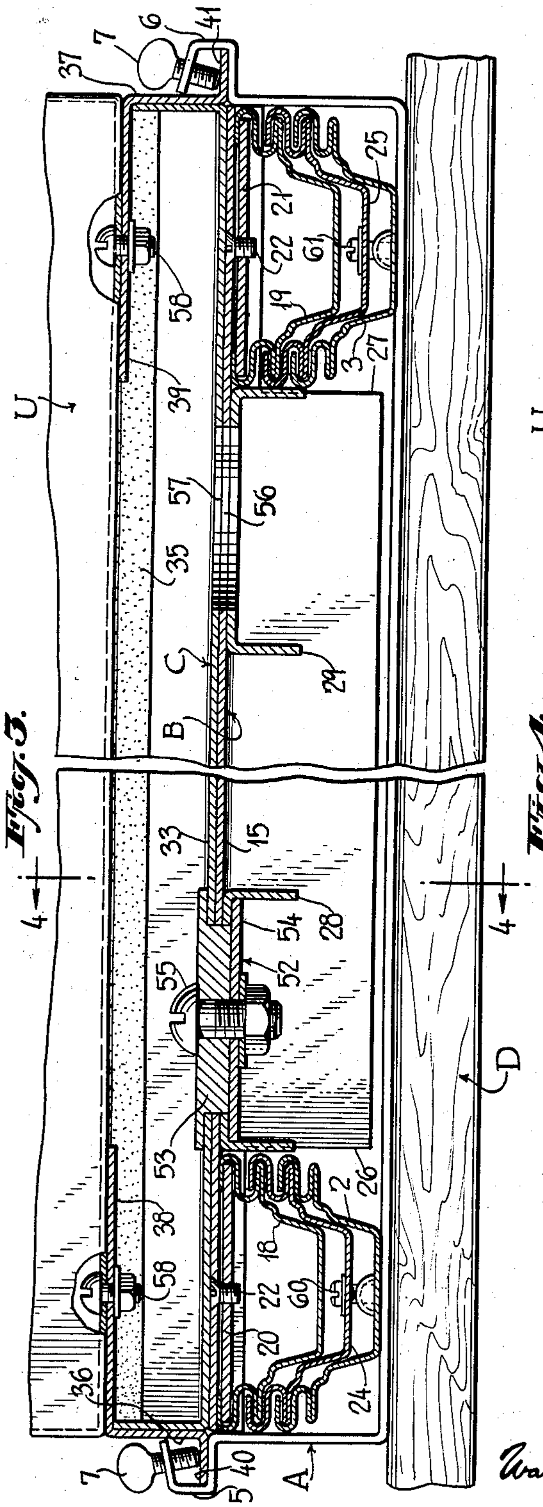
Fig. 3 is a fragmentary cross-sectional view taken at the line 3—3 of Fig. 1*a* showing further details of the parts on an enlarged scale.

The foundation assembly comprises a base plate 1 provided with laterally spaced substantially parallel guideway components such as the slide rails 2—3 which have their rear ends rigidly secured as by welding to the base plate 1 and whose forward ends project forwardly of the base plate 1. The assembly is rigidly secured to the sill D by suitable means such as screws 4 (Figs. 1, 2 and 3). The base plate 1 at its lateral opposite sides (Fig. 3) extends vertically upwardly and terminates in locking channels designated 5 and 6 facing toward each other.

The upper flange of the locking channels 5 and 6 is provided with suitable fastening means such as the thumb screws 7 (Figs. 2 and 3) for the purpose to be hereinafter described. The slide rails 2 and 3 carry at their forward ends supporting braces 8 and 9 (Figs. 1 and 2) whose upper ends are pivotally secured such as at 10 (Fig. 2) by clips such as 11 to the outer extremity of the respective rails and the lower ends of the braces 8 and 9 are pivotally attached as at 12 to clips such as 13 which are rigidly secured as by screws to a part of the fixed structure such as a wall W. Preferably, the brace members 8 and 9 are made of two parts in telescopic sliding engagement to permit ready adjustment of the length of the braces and when suitably adjusted, the telescopic parts are locked in adjustable position by suitable means such as screws 14.

*Sliding tray*

The sliding tray B (Figs. 1, 3 and 4) comprises a horizontal plate 15, which extends in a lateral direction substantially the full width of the bottom portion of base plate 1 with its lateral edges having sufficient clearance with the vertical extending portion of the plate 1 to permit free sliding longitudinal movement relative thereto; and the plate 15 is provided at its rear edge (Fig. 4) with downwardly extending flange 16 and at its forward edge with a corresponding downwardly extending flange 17. A pair of slide rails 18—19, complementary to the sliding rails 2—3, are disposed in substantially parallel relation adjacent the respective opposite lateral sides of plate 15 and are rigidly secured thereto as by plates 20 and 21 (Figs. 1 and 3) which engage respective slide rails 18—19 and are secured to the underside of the plate 15 by suitable means such as screws 22. The pair of slide rails 18—19 are in sliding cooperative engagement with a pair of intermediate slide rails 24—25 which are also in cooperative sliding engagement with the pair of slide rails 2—3 secured to the base plate 1, to thereby permit greater movement of the sliding tray B with respect to the base assembly A. The rear flange 16 and front flange 17 (Fig. 4) are cut out as at 26 and 27 to provide space for the passage of the slide rails.

The plate 15 is preferably reinforced by a pair of laterally spaced channels 28—29 welded to the bottom face thereof and extending in a longitudinal direction closely adjacent the slide members 18—19.

The forward flange 17 preferably is provided along its entire lateral extent with a sealing gasket 30 preferably such as rubber or the like flexible material, secured to the inner face of the flange as by means of a clip such as 31 and rivets such as 32; the gasket 30 extending downwardly below the lower edge of flange 17 and adapted to engage the forward edge of the base plate 1 (Figs. 4 and 1*a*) when the unit is in position for use.

The laterally extending reinforcing flanges 16—17 together with the longitudinally extending reinforcing channels 28—29 serve to stiffen the plate 15 and hold its upper surface in a substantially horizontal plane to assure proper sliding engagement between the guideway components and to facilitate pivotal movement of the tray C on the tray B in a manner to be more particularly described below.

*Pivotal tray*

Figure 4:
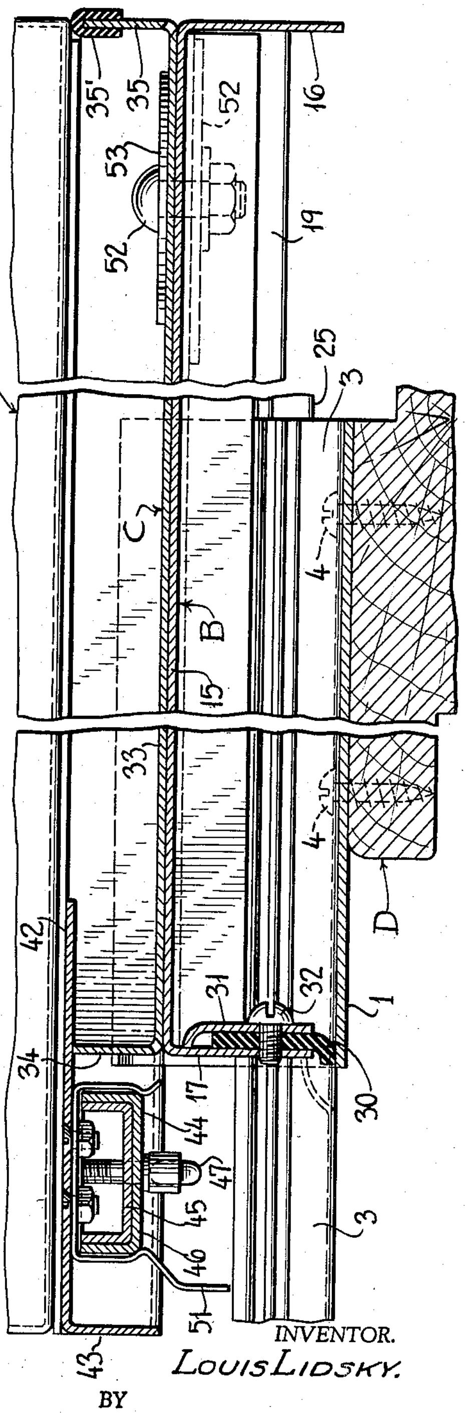
Fig. 4 is a fragmental side elevational view, partly in section, of the mounting in the adjusted position shown in Fig. 1*a*.

Referring more particularly to Figs. 1, 3 and 4: The pivotal tray C comprises a horizontal plate 33 provided at its forward and rear edges with upwardly extending reinforcing flanges 34 and 35 (Fig. 4) in substantial alignment with the downwardly extending flanges 17—16 on the sliding tray B. The rear flange 35 is preferably provided with a suitable sealing gasket 35' made of rubber or other suitable flexible material and extending the full lateral extent of tray C for sealing engagement with the rear lower edge of the air conditioner unit U. The plate 33 extends laterally a distance substantially equal to that of the plate 15, upon which it rests, and the laterally spaced longitudinal edges of plate 33 are provided with upturned flanges rigidly secured as by welding to reinforcing marginal strips 36 and 37 extending vertically upwardly, provided along their upper edges with inwardly extending attachment flanges 38—39, lying in a plane parallel to the plate 33, and at their lower edges with laterally outwardly extending locking flanges 40—41, lying substantially in the plane of the plate 33, disposed within the locking channels 5—6 and engageable by the thumb screws 7.

The members 36—37 extend forwardly beyond the flange 34 and the flanges 38—39 are spaced upwardly from the flange 34 to provide for receiving therebetween a laterally extending member providing a subtsantially horizontal rearwardly disposed flange 42 (Figs. 1 and 4) disposed beneath and welded to the forward ends of flanges 38—39 (Fig. 1). Integrally formed with the flange 42 and forming a part of the same reinforcing member is a downwardly extending flange 43 substantially parallel to the flange 34 (Fig. 4) and providing therewith a recess disposed upwardly of the flange 17 and plate 15 for receiving a folding leg designated in general as 44 and preferably comprising an upper part 45 and a lower part 46 (Fig. 6) telescopically engaged to provide for adjustable length and secured together by suitable means such as handle screw 47. The upper end of the leg 44 is pivotally attached adjacent its upper end to the forward end of the member 37 by means of a hinge 48 providing for movement of the leg 44 from the extended position shown in Figs. 2, 5 and 6 to the folded position shown in Fig. 4. Thus the leg is attached to the lateral side of the tray C opposite its pivot 52 diagonally opposite thereto. When the tray C is pivoted at its right hand corner, as described hereinafter, the leg 44 is attached to the forward end of the member 36 on the left hand side of the tray C.

A suitable brace 49 has its lower end offset and pivotally secured in leg 44 and its upper end provided with a parallel offset engaged in a slot 50 provided between the lower face of flange 42 and a cut-out portion in the flange 34 to permit the leg to be folded within the space between flanges 34 and 43. The slot 50 terminates at its right hand end (Fig. 5) in an offset 50*a* serving to lock the brace 49 in position when the leg 44 is extended and a corresponding offset 50*b* is provided at the opposite end of the slot to serve a like function when the leg is attached to the left hand side. A clip 51 (Figs. 4 and 1) is provided within the leg receiving recess for holding the leg in folded position.

The pivotal tray C is pivotally secured to the sliding tray B at its left hand rear corner by means of a pivotal attachment designated in general as 52 (Fig. 1). This pivotal attachment in the present embodiment (Fig. 3) comprises a bearing member 53 having a cylindrical portion disposed within corresponding cooperating holes passing through the plate 33, the plate 15 and the reinforcing channel member 28, and being provided at its upper end with a flanged head resting upon the plate 33 and engaged on its lower end by a square washer 54 secured in position on the bearing member 53 by a nut and bolt fastening means 55. In order to provide for alternative pivotal attachment at the right hand corner, the sliding tray B is provided with a hole 56 (Fig. 1 and 3) passing through the plate 15 and reinforcing channel 29, and the pivotal tray C is provided with a cooperating hole 57 passing through the plate 33. When it is desired to have the pivot located at the right hand corner, the pivotal attachment must be removed from hole 52 and placed in hole 56 (Fig. 1) so that the pivotal top tray can swing in the opposite direction.

It will be seen from the foregoing that the pivotal tray C is provided with marginal portions at its two lateral sides for supporting the conditioner unit U upwardly from the plate 33. With reference to Figs. 1, 3 and 4, it will be seen that these marginal supporting portions comprise the longitudinally extending laterally spaced members 36—37 (Fig. 3) to the flanges 38—39 of which the casing of the conditioner unit U is suitably secured by bolts such as 58 passing through the flanges 38 and 39.

*Limit stop means*

Stops 59 and 59' (Figs. 1 and 5) are provided at the front side of the pivotal tray C at the extreme outer lateral edges in alignment with the locking flanges 40—41 respectively so as to engage the forward ends of the locking flanges 5—6 respectively to limit the outward travel of the sliding tray B and attached pivotal tray C to the position shown in Fig. 1*a*.

The inward travel of the trays B and C are limited to the innermost sliding position shown in Figs. 1 and 2 by latching means designated in general as 60 and 61 being of identically the same construction, one associated with the slides on each lateral side. Each latching means, such as 61 (Figs. 7 and 8) comprises a flexible latch such as 62 fastened at its rear end by a bolt and nut such as 63 to the respective intermediate slide such as 25 and provided on its forward end with a downwardly extending finger 64 which in its extended position is disposed in an opening provided by the stamped out lip 65 in the respective bottom slide rail such as 3 secured to base plate 1. The finger 64 is rounded on its lower end so that as the slide 25 is moved to the left or right the finger rides up and assumes the dotted line position, permitting the outward movement of the parts to the position shown in Fig. 1*a*. The latch 62 may be flexed upwardly above the lip 65 and moved sideways about the bolt 63 to the dotted position shown in Fig. 7 to permit the intermediate slide rails such as 25 and parts connected thereto to be entirely removed from the foundation assembly when desired. During assembly, or when the removed parts are to be replaced, the latch 62 is centered in the full line position, where it is held by a detent 66 engaging a recess 67, and the finger 64 rides over the incline provided on lip 65. Suitable fixed stop means (not shown) are provided for limiting the inward movement of the upper slide rail members 18—19 with respect to the intermediate rails 24—25 beyond the inward limit shown in Figs. 1, 2 and 5. Thus the inward and outward sliding movement of the trays B and C with respect to the foundation assembly A is provided for.

Having thus described my invention with particularity with reference to presently preferred embodiments thereof, it will be obvious to those skilled in the art, after understanding my invention, that various changes and modifications may be made therein without departing from the spirit and scope of my invention, and I aim in the appended claims to cover such changes and modifications as fall within the scope of the invention.

I claim:

1. An air conditioner unit adjustable mounting comprising a foundation assembly adapted to be secured on a window sill and provided with laterally spaced substantially parallel guideway components, a sliding tray mounted upon said foundation assembly and provided with guideway components in coopeartive sliding engagement with the guideway components on said foundation assembly, a pivotal tray supported on said sliding tray for movement therewith and pivotally secured thereto adjacent a rear corner for angular movement relative thereto, and a folding leg hinged at its upper end to the front corner of said pivotal tray adjacent the side thereof opposite said pivotally secured rear corner and foldable beneath the front edge of said pivotal tray.

2. An air conditioner unit adjustable mounting as set forth in claim 1 in which the cooperative guideway components comprise a pair of lower slide rail members forming a fixed part of said foundation assembly, a pair of upper slide rail members forming a fixed part of said sliding tray and a pair of intermediate slide rail members telescopically slidably engaging said lower slide rail members and said upper slide rail members.

3. An air conditioner unit adjustable mounting comprising a foundation assembly adapted to be rigidly secured on a window sill, said foundation assembly comprising a base plate serving as the member to be rigidly secured to the sill, a first pair of laterally spaced substantially parallel slide rail components rigidly secured at their rear ends to said plate and extending forwardly thereof and supporting brace means secured to the forwardly extending ends of said slide rail components, a sliding tray mounted upon said foundation assembly and provided with guideway components in cooperative sliding engagement with the guideway components on said foundation assembly, a pivotal tray supported on said sliding tray for movement therewith and pivotally secured thereto adjacent a rear corner for angular movement relative thereto, and a folding leg hinged at its upper end to the front corner of said pivotal tray adjacent the side thereof opposite said pivotally secured rear corner and foldable beneath the front edge of said pivotal tray.

4. An air conditioner unit adjustable mounting comprising a foundation assembly adapted to be rigidly secured on a window sill, said foundation assembly comprising a base plate serving as the member to be rigidly secured to the sill and provided adjacent its laterally opposite sides with locking channels, a first pair of laterally spaced substantially parallel slide rail components rigidly secured at their rear ends to said plate and extending forwardly thereof and supporting brace means secured to the forwardly extending ends of said slide rail components, a sliding tray mounted upon said foundation assembly, said tray comprising a second pair of slide rail components rigidly secured to thereto in cooperative alignment with the slide rails on said foundation assembly, a third pair of slide rail components in cooperative telescopic sliding engagement with said first and second pairs of slide rails, and a pivotal tray supported on said sliding tray for movement therewith and pivotally secured thereto adjacent a rear corner for angular movement relative thereto, said pivotal tray including means for supporting said air conditioner unit and being provided with locking flanges along its laterally opposite sides slidably disposed in said locking channels, fastening means for securing said locking flanges in adjusted position within said locking channels.

5. An air conditioner unit adjustable mounting comprising a foundation assembly adapted to be secured on a window sill and provided with laterally spaced substantially parallel guideway components and with locking channels along its opposite lateral sides facing toward each other, a sliding tray mounted upon said foundation assembly and provided with guideway components in cooperative sliding engagement with the guideway components on said foundation assembly, and a pivotal tray having a bottom portion supported on said sliding tray for movement therewith and pivotally secured thereto adjacent a rear corner for angular movement relative thereto, said pivotal tray being provided along its opposite lateral sides with outwardly extending flanges in cooperative sliding register with said locking channels and with marginal portions disposed above said bottom portion and forming a coplanar support for said air conditioner unit.

6. An air conditioner unit adjustable mounting as set forth in claim 5 in which the sliding tray is provided on its lower face with laterally spaced longitudinally extending reinforcing channels disposed adjacent the guideway components and the means for pivotally securing said pivotal tray on said sliding tray passes through one of said reinforcing channels adjacent corresponding rear corners of said sliding and pivotal trays, and said pivotal tray is provided with a supporting leg attached to its front corner diagonally opposite said pivotal means.

7. An air conditioner unit mounting as set forth in claim 5 in which the bottom portion of said pivotal tray is provided with longitudinally extending vertical flanges disposed at its laterally opposite edges and said outwardly extending locking flanges are formed integrally with upwardly extending walls and oppositely disposed flanges extending inwardly toward each other substantially parallel to the bottom of said pivotal tray and constituting laterally spaced longitudinally extending marginal portions for supporting said air conditioner unit, said upwardly extending walls lying along the outer face of said vertical flanges respectively and being rigidly secured thereto.

8. An air conditioner unit adjustable mounting comprising a foundation assembly having a base plate adapted to be secured on a window sill and provided with laterally spaced substantially parallel guideway components rigidly secured to said plate and extending forwardly thereof, a sliding tray providing a substantially horizontal upper surface and provided on its lower side with guideway components in cooperative sliding engagement with the guideway components on said foundation assembly and serving to support said sliding tray, a pivotal tray providing a substantially horizontal lower surface in supporting engagement on said sliding tray for movement therewith and pivotally secured thereto adjacent a rear corner for angular movement relative thereto, said pivotal tray having means spaced upwardly from its lower side for supporting an air conditioner unit and a folding leg hinged at its upper end to the front corner of said pivotal tray adjacent the side thereof opposite said pivotally secured rear corner and foldable beneath the front edge of said pivotal tray.

References Cited in the file of this patent

UNITED STATES PATENTS 2,717,508 Loveley et al. ---------- Sept. 13, 1955